United States Patent [19]

Bull

[11] Patent Number: 4,919,777

[45] Date of Patent: Apr. 24, 1990

[54] ELECTROSTATIC/MECHANICAL EMULSION TREATING METHOD AND APPARATUS

[76] Inventor: Hendrix R. Bull, P.O. Box 271203, Escondido, Calif. 92027

[21] Appl. No.: 66,770

[22] Filed: Jun. 25, 1987

Related U.S. Application Data

[63] Continuation-in-part of Ser. No. 35,554, Apr. 7, 1987.

[51] Int. Cl.$^5$ .............................................. B01D 19/00
[52] U.S. Cl. ........................................ 204/188; 55/45;
 55/174; 55/175; 55/187; 204/302; 204/308;
 210/180; 210/260; 210/774; 210/DIG. 5
[58] Field of Search ...................... 204/302, 304–308,
 204/188–190; 55/45, 171–177, 187; 210/DIG.
 5, 774, 802, 180, 259, 260

[56] References Cited

U.S. PATENT DOCUMENTS

| | | | |
|---|---|---|---|
| 3,577,336 | 5/1971 | Shirley | 204/302 |
| 3,674,677 | 7/1972 | Roberts | 204/302 |
| 3,898,152 | 8/1975 | Hodgson | 204/308 |
| 4,226,689 | 10/1980 | Mayse et al. | 204/188 |
| 4,231,867 | 11/1980 | Sutphin | 210/703 |
| 4,329,159 | 5/1982 | Bull | 55/42 |
| 4,591,441 | 5/1986 | Sakai | 210/649 |

FOREIGN PATENT DOCUMENTS 52-48871  4/1977  Japan .......................... 210/DIG. 5

Primary Examiner—John F. Niebling
Assistant Examiner—William T. Leader
Attorney, Agent, or Firm—Allan R. Fowler

[57] ABSTRACT

A treater for electrostatically and/or mechanically separating emulsified brine from oil during longitudinal flow through a horizontally elongate metal tank, wherein coalescer elements are provided for enhancement of the de-emulsification process. Following the diffusion and distribution of the flowing emulsion across the transverse area of the treater, the emulsion is directed through electrical fields where the brine droplets take on an electrical charge, then moved through an electrically-grounded coalescing element comprising a multiplicity of longitudinally-extending downwardly-inclined open-ended tubes arranged in bundle-fashion. Individual tubes present opposition to the flow of emulsion for contact between brine droplets of the emulsion and the interior surfaces of the tubes, the brine droplets adhering to the tube surfaces where they lose their charge and accumulate, trickling downwardly by gravity to a brine sump. De-emulsified oil is removed in a stream separate from the brine stream. The treater also operates mechanically, with reduced efficiency, when electricity is unavailable.

21 Claims, 3 Drawing Sheets

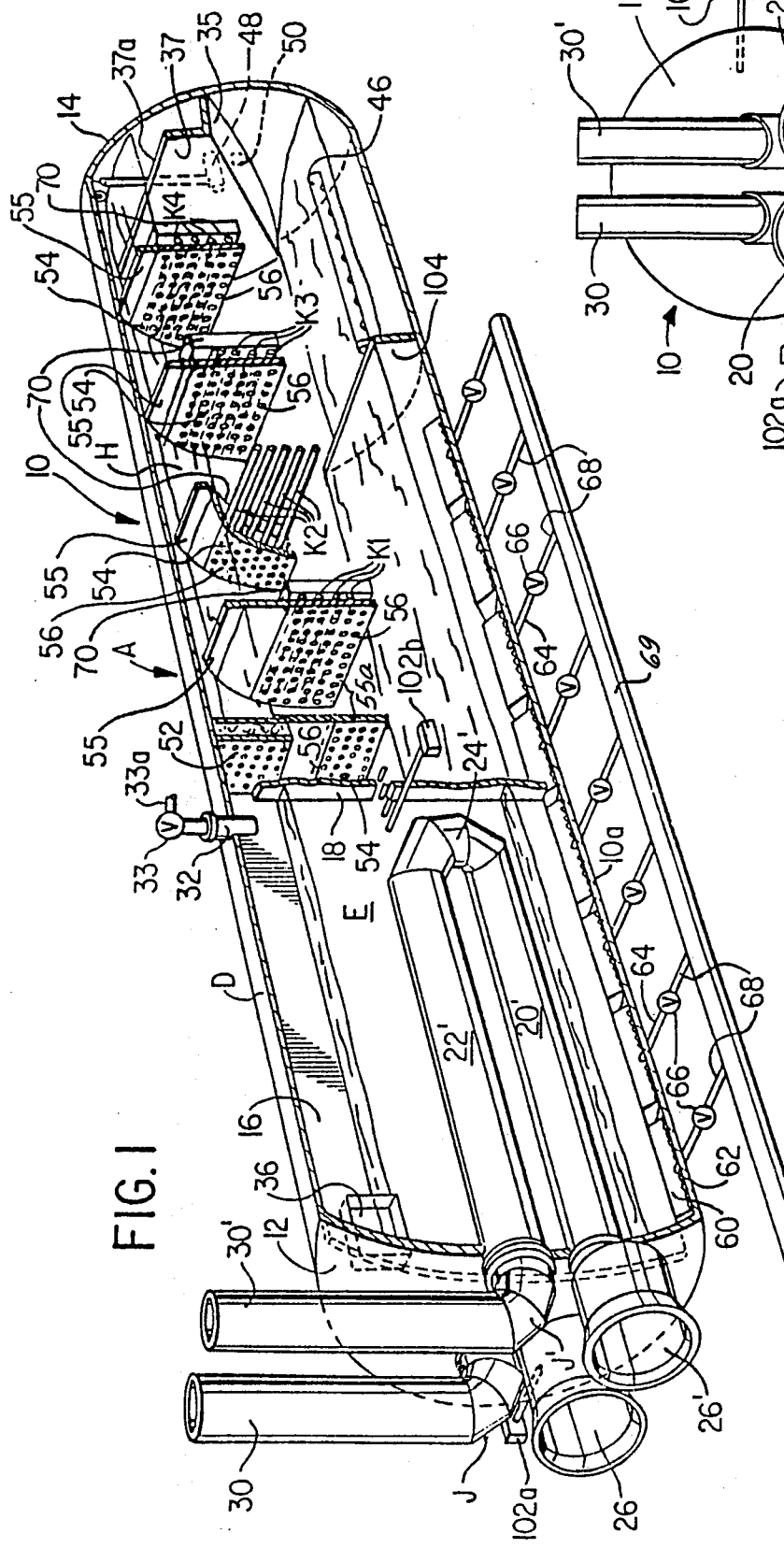
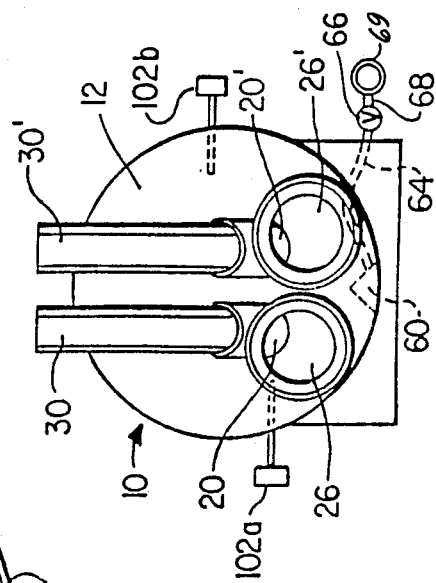
FIG.1
FIG.2

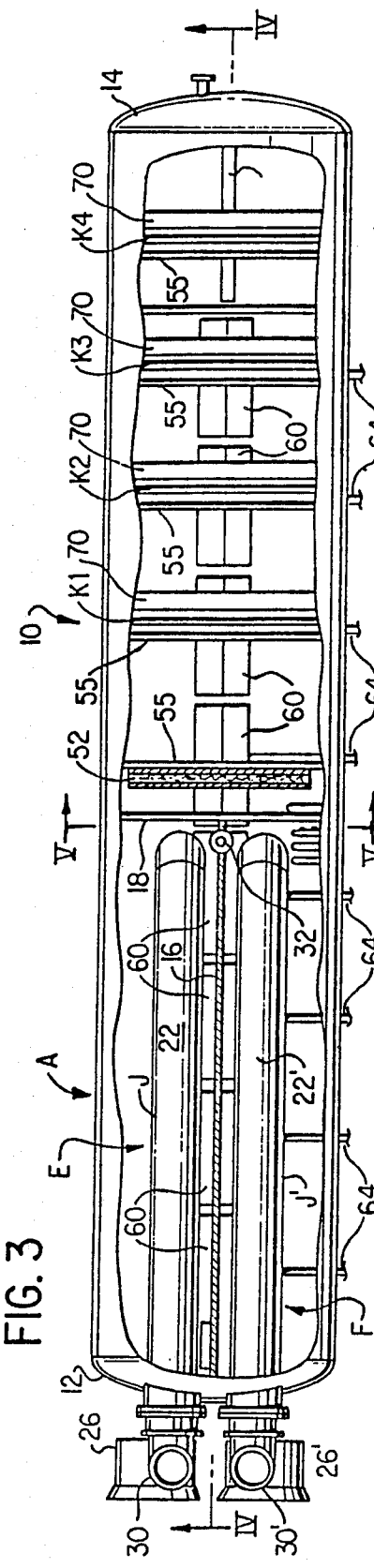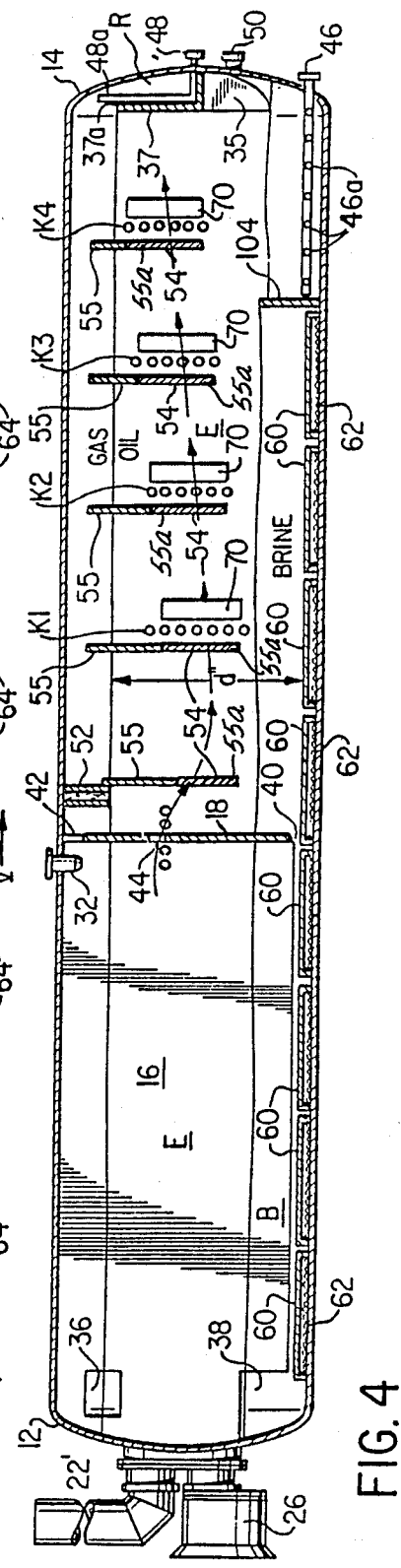
FIG. 3
FIG. 4

ELECTROSTATIC/MECHANICAL EMULSION TREATING METHOD AND APPARATUS

This application is a Continuation-in-part of application Ser. No. 07/035,554 filed on April 7, 1987.

BACKGROUND TO THE INVENTION

Field of the Invention

Petroleum as it is naturally produced from an underground formation, is in most cases a mechanical mixture of oil, entrained gas and salt water, some of which latter may be present as an oil/brine emulsion. It is desirable, and usually necessary to treat the petroleum thus produced at the wellhead, for the separation and removal of the entrained gas and emulsified brine, in order to render the oil pipelineable. Usually, the separated salt water is pumped back into the formation, in order to assist in maintaining the pressure therein, and also to resolve the salt water disposal problem. Separated gas is vented or flared, if in small quantities, and if in commercial volumes, is delivered to a pipeline for distribution. The equipment used for this three-phase separtion is known as a treater, and is generally quite familiar to those to whom the present invention will be addressed.

Such treaters normally involve the heating of the produced petroleum, in order to lower the viscosity of the fluid phase, and also to assist in the separation of the entrained gas. Brine droplets are coalesced either mechanically, as by forcing the emulsion through a series of perforated baffles; or electrostatically as by forcing the emulsion through a high-energy, electrically charged field; or chemically, by means of surface-active chemical agents which reduce the surface tension on the water droplets, thereby allowing them to coalesce into larger drops for separation by gravity. Frequently, two or more coalescing methods are employed in a treater.

Treaters have evolved in design from early developed open vats which maintained the produced petroleum in stationary condition for several days, permitting the entrained gas to freely separate to atmosphere and the salt water to separate to the bottom of the vat by gravity. There evolved heating methods in order to expedite the treatment by reducing the viscosity of the oil, as described. Subsequent development evolved the heater-treater which is the current state-of-the-art comprising an elongated enclosed tank having a burner-fired heater section and a downstream treater section for continuous flow, with a series of perforated baffles positioned within the treater section transversely to the flow of fluids; the perforated baffles function to promote the even distribution over the full cross-sectional area of the treater section of the fluids in motion, and to cause a pressure drop within the fluid across the perforated baffles which results in a release of entrained gases, which then collect in the upper volume of the tank for removal. However, salt water emulsions within the oil have continued to be inefficiently treated by gravity settling and baffling of the flow following heating; thus, further measures have been necessary in order to cause coalescing of the small droplets of brine into larger drops which could be settled out by gravity.

The conventional treatment has the operational disadvantages of being time-consuming, due to the residence-time required in the treater and the requirement that the petroleum be heated to a sufficiently high temperature to reduce the viscosity thereof so that coalescing of the emulsified droplets will be encouraged. The maintenance of a large quantity of oil at a relatively high temperature is costly of energy, and requires the equipment involved to be capable of sustained operation at the temperatures involved.

Treaters in current use are normally tanks in the form of elongated horizontal cylinders divided by means of internal partitions into compartments through which the petroleum will sequentially flow. Burner-fired heaters are normally included in the upstream heater section for heating the emulsion to the desired temperature, during which most of the entrained gas and some of the brine will separate from the emulsion. The partially-de-emulsified brine then flows into a treater section, in substantially gas-free state, encountering a series of baffles adapted to encourage even flow of fluids and to avoid the formation of flow channels within the fluid body, thereby to assist in separation of remaining gases and coalescing of water droplets, and their separation by gravity to the bottom of the tank for ultimate discharge removal.

Various techniques of improvement have heretofore been employed in order to minimize treatment time and heat energy consumption. In my U.S. Pat. No. 4,329,159, "Energy Saving Heavy Crude Oil Emulsion Treating Method and Apparatus for Use Therewith", there is described a method and apparatus of the type described, additionally including a number of metallic apertured grid electrodes suspended adjacent apertured baffles, the electrodes being supplied with electrical energy. A series of longitudinally spaced electrical fields of high potential are thereby created, which cause droplets of emusified brine to move in violent random fashion, the droplets coalescing and collecting into drops of sufficient weight as to fall by gravity to the lower portion of the treater section for removal.

While the addition of the electrostatic elements thus described has resulted in enhanced separation of the oil and brine, the invention now described discloses a further improvement, in which a series of coalescer or collector elements of unique design are positioned within the treater compartment each in immediate downstream relationship from an electrostatic element, the coalescer element being electrically grounded to the tank thereby causing the brine droplets to be attracted to the coalescer element where coalescing into brine drops occurs, followed by gravity collection and removal.

Even when electricity is not economically available, the present invention operates as a mechanical (non-electrolytic) treater in which a brine de-emulsifying element consists of a bundle of open-ended tubes having foreshortened vertical dimensions positioned downwardly inclined in the direction of flow. Individual tubes present opposition to the flow of emulsion for contact between the brine droplets of the emulsion and the interior surfaces of the tubes, the brine droplets adhering to the tube surfaces for accumulation and downwardly trickling by gravity to a sump for collection and removal. Each such tube having a diameter of approximately one inch and a length of approximately one foot, brine droplets moving forwardly with the emulsion and passing through the open-ended passages of the collector elements will be separated from the emulsion by contact with and adhesion to the interior surfaces of the tubes. Contact with a surface of one of such tubes will be facilitated in accordance with Stokes Law of Fluid Flow, as will be hereinafter described.

Downward inclination of the tubes in the direction of flow assists in keeping the tubes clear of particulate solids which settle out from the oil, by permitting such solids to fall longitudinally through the tubes, for collection and removal.

In some cases of crude oil production where the oil is produced in association with salt water where the water content is extremely high (in some cases up to 90 percent), the non-emulsified water can readily be separated prior to the delivery of the emulsified oil and water to a treater. In such cases, a separator known a Free Water Knockout, incorporating the within invention, will function well by increasing the tube diameters and the flow velocities in order to accommodate the larger volumes of fluids.

In the method and apparatus of the present invention, an electrode grid is suspended in the emulsion upstream of the coalescer element to induce an electrostatic charge on the brine droplets as they move downstream into the region of the coalescer, which is electrically grounded to the tank. In addition to activating the random movements of the brine droplets, the electrostatic charge augments the attraction of the brine droplets to the coalescer, thus enhancing the separation of the emulsion.

A principal object of the present invention is to provide an apparatus and method for treating a heavy emulsion to obtain a substantially complete separation of brine and gas from the oil in acceptable time and with a lesser consumption of energy and the capability, but not the necessity, of using electrostatic elements.

Another object of the invention is to effect the coalescing of droplets of brine in the emulsion by subjecting the droplets to an electrostatic charge, causing coalescing thereof when electricity is available; then, regardless of the availability of electricity, causing such coalesced droplets to pass into a collector element in which the vertical component of their trajectory, before contacting a metallic surface of the coalescer element (the coalescer being electrically grounded when electricity is used), is effectively minimized, thereby achieving substantially complete separation of brine from the oil.

A yet more particular object of the invention is to provide an apparatus for separating oil, brine and gas from an emulsion, comprising a generally horizontal separating vessel including means for passing the emulsion through an electrical field then through a collector means in which flow paths having foreshortened vertical dimensions are provided, and which are forwardly and downwardly inclined, thereby providing a multiplicity of downwardly inclined brine collector surfaces on which the brine component of the emulsion may collect for trickling downwardly by gravity towards the bottom of the vessel for discharge.

These general objects as well as other and more specific objects of the invention will be fulfilled in the following description and claims, taken in conjunction with the attached drawings.

SUMMARY OF THE INVENTION

An improvement in the oil/water separation mechanism of a three-phase gas/oil/water emulsion treater. A horizontal vessel is provided, which comprises a two-section treater, having a first heater section defining a heating zone and a downstream treater section defining a de-emulsifying zone.

Separation of the gas phase from the liquid phase is assisted by the heating of the combined mixture and occurs in both zones. Brine de-emulsifying elements are provided in the de-emulsifying zone which, sequentially, distribute and spread the emulsion across the width of the vessel to provide minimum velocities and an even distribution throughout the de-emulsifying zone; electrostatically charge the brine droplets with an electrical potential when electricity is available; and collect the droplets, which are charged when electricity is available, on a metallic coalescer element which consists of a series of open-ended tubes having foreshortened vertical dimensions, positioned downwardly inclined in the direction of flow and arranged in a bundle spanning the vessel at the level of the emulsion, the coalescer element being electrically grounded to the tank when electricity is available.

The apparatus includes means for maintaining the fluid levels in the tank at preselected depths.

An upper oil outlet, and upper gas outlet and a brine sump and brine outlet is provided for the collection and subsequent removal of the brine which collects by gravity from the collector elements.

BRIEF DESCRIPTION OF THE DRAWINGS

FIG. 1 is a perspective view of the preferred embodiment apparatus of the invention, with a longitudinal portion thereof cut away to illustrate the interior of the apparatus;

FIG. 2 is an end view of the apparatus of FIG. 1 depicting the heater section;

FIG. 3 is a top plan view of the apparatus of FIG. 1 with a portion cut away to illustrate the position of the several components and the location of certain outlets;

FIG. 4 is a longitudinal cross-sectional view of the apparatus of FIG. 1;

DESCRIPTION OF THE PREFERRED EMBODIMENT

Figure 5:
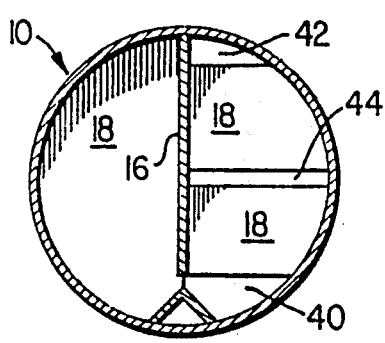
FIG. 5 is a transverse cross-sectional view of the apparatus taken on the line 5—5 of FIG. 3, depicting the transfer bulkhead separating the heater section from the treater-section.

Referring to FIG. 1, and Apparatus A is disclosed by which the method of the present invention may be carried out to effect a separation of a viscous emulsion E into the respective components thereof, namely brine B, gas G and substantially brine-free oil O.

The Apparatus A of FIG. 1 depicts a two-stage heater section and downstream treater section, within an elongate cylindrical metallic tank 10, having a first end 12 and a second end 14. A bulkhead 18 separates the tank 10 into the two functional compartments, these being the heater section depicted at D in FIG. 1 and the treater section H. A longitudinally extending bulkhead 16 extends from the first end 12, to the bulkhead 18, thereby defining two longitudinally-extending heater compartments E and F, situated side-by-side connected in series and comprising the heater section of the apparatus.

The heater section has substantially identical first and second heaters J and J' disposed therein, as depicted in FIG. 1. Each heater J and J' includes a lower elongate tubular leg 20 and 20', upper tubular-leg 22 and 22', and the U-shaped end connector 24 and 24'. The lower legs 20 and 20' extend through the first end 12, and burner assemblies 26 and 26' are connected to the lower legs 20 and 20' exteriorly of the tank 10. The upper legs 22 and 22' are stack-connected at 30 and 30', extending upwardly therefrom outside of the tank 10.

Emulsion E is delivered continuously into the heater compartment D through the inlet 32 which desireably has a normally-open manually operated valve 33 associated therewith, which valve is connected by a conduit 33a to the emulsion supply. Inlet 32 is so constructed that emulsion E is delivered only into the first stage E of the heater section D.

The longitudinal bulkhead 16 has an upper opening 36 therein, preferably in the form of an open-ended transversely extending box, that is located adjacent the first end 12 of the tank. Longitudinal bulkhead 16 also has a lower opening 38 (FIG. 4) therein, also adjacent the end 12.

The transverse bulkhead 18 will now be described in specific detail, and reference is made to FIG. 5, where it will be seen that the bulkhead 18 is asymetrical, divided diametrically by the longitudinal bulkhead 16 into a left solid half and a right perforated half having a lower opening 40, upper opening 42 and intermediate opening 44 defined therein, the function of which will be hereinafter explained.

Turning now to the far end 14 of the tank 10, an angularly disposed baffle 35, FIG. 1, extends inwardly into tank 10 and is connected at its inner edge to a vertical transverse baffle 37 having an upper horizontal edge 37a. The bulkhead 37 acts as a weir, and determines the depth of the emulsion throughout the apparatus, as will later be explained. Baffle 35, bulkhead 37 and the interior surface of tank 10 adjacent the end 14 cooperate to define a reservoir into which substantially brine-free oil O is discharged, which results from the up-stream treatment of the emulsion in the apparatus.

Tank end 14 has a gas outlet 48, brine-free oil outlet 50 and brine outlet 46 positioned therein as shown in FIGS. 1 and 4.

A foam-removing assembly 52 is disposed in the treatment section H adjacent the upper opening 42 as shown in FIGS. 1 and 4.

De-emulsifiers located in the treatment zone comprise sets of de-emulsifying elements operating in series, longitudinally spaced within the treatment section H. Each set of de-emulsifying elements including, firstly: a transverse baffle 54, FIG. 1, adapted to distribute the slowly moving emulsion uniformly across the width of the vessel 10; secondly, electrode grids K-1 to K-4, supported by electrically insulated brackets within the tank immediately downstream of each transverse baffle 54; and thirdly, coalescing elements, electrically grounded to the tank 10 immediately downstream of each electrode grid K-1 to K-4, upon which the brine droplets will coalesce, as is hereinafter explained.

The tansverse baffles 54 comprise a solid upper portion 55 and apertured lower portion 55a desirably having therein transversely-slotted openings 56, as depicted in FIG. 1.

The electrostatic grids K-1 to K-4, transversely disposed in vertical alignment immediately downstream from the baffles 54, are supported from the metallic tank 10 by conventional electrical insulating means (not shown). An electrical current-supplying transformer (not shown) supplies high voltage to the electrostatic grids.

Figure 6:
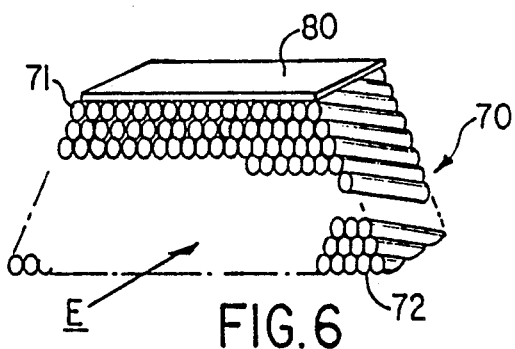
FIG. 6 is a frontal perspective view of a first embodiment of the coalescer element.

Positioned adjacent each of the electrostatic grids K-1 to K-4 on the downstream side thereof are disposed coalescer elements 70, as shown in FIGS. 1 and 4, extending transversely across the interior of the tank 10, in general downstream alignment with the diffusion plates 54 and the electrostatic grids. In FIG. 6 it will be seen that the coalescer elements 70 are shaped to conform generally to the circular interior of the tank 10 truncated at top and bottom so that the upper edge 71 and the lower edge 72 are aligned with the upper and lower edges, respectively, thereof of the electrostatic grids K-1 to K-4, and thus of the diffusion baffles 54, the transverse extent of the grids K-1 to K-4 being substantially the same as that of the baffles 54. The coalescer elements 70 are supported from the tank 10 by conventional metal bracket means (not shown) and are thus electrically grounded to the tank 10. A detailed description of the coalescing elements 70 now follows, and specific reference is made to FIG. 6, in which a first embodiment of the coalescing element is depicted comprising a bundle of short, open-ended tubes 71 of corrosion-resistant metal such as stainless steel. Tubes are conveniently secured in bundles conforming to the general interior contour of the cross-section of the tank as depicted in FIG. 1, by perforated plates. Bundles are secured to the interior of the tank by conventional bracket means (not shown).

Figure 8:
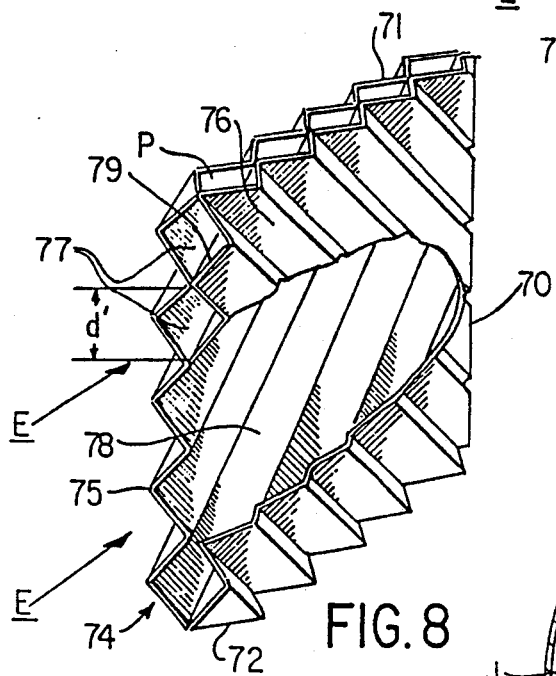
FIG. 8 is an enlarged fragmentary perspective view of a second embodiment of the coalescer element depicted in FIG. 6.

A detailed description of another preferred embodiment of the coalescer elements 70 now follows, and specific reference is made to FIG. 8, in which the coalescing element is comprised of a horizontal stack array of angularly crimped sheets of metal, which may optionally be corrosion-resistant such as stainless steel depicted at 74. The angular crimpings 75 are pressed or rolled into the sheets 74 in a direction inclined to the vertical as depicted in FIG. 8. Successive sheets are arranged in side-by-side stacked configuration with crimpings running in alternating opposite directions, the effect of which is that an array of elongated open-ended tubes will be defined between adjacent sheets, one side of which tube will be smooth-walled, as at 76, the other side of which will be ridged, as at 77. Downwardly moving emulsion E will be directed along the tube passage P, and the entrained droplets of brine will move into contact with either of the surfaces 76 and 77 of the tubes. The droplets upon adhering to such surfaces, will slowly trickle downwardly by gravity, and will be directed into the passages 78 defined in the crimped surface 77 where they will be isolated from the forwardly moving oil flow and permitted to further coalesce and trickle downwardly to the lower extremity 72 of the collector elements.

Figure 7:
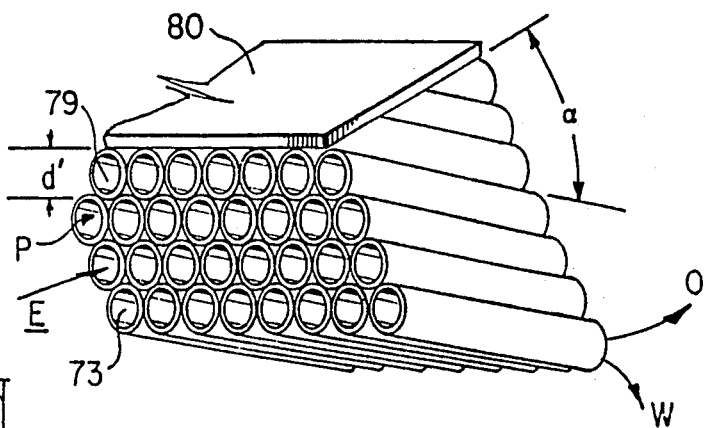
FIG. 7 is an enlarged fragmentary perspective view of the first embodiment of the coalescer element, depicted in FIG. 6.

A further enhanced brine separation action will occur as droplets of brine move along the passages 78, by virtue of the minimized vertical distance d' FIGS. 7 and 8, in which such droplets are required to travel before contacting any metallic collecting surface 79, as compared with the vertical distance d'', FIG. 4 which would be the case in the absence of the collector elements 70. It will be understood that upon an electrically charged brine droplet nearing a metallic surface which is electrically grounded, the brine droplet will be attracted to the metallic surface where surface tension will tend to hold it and bring it into miscible contact with other such droplets to form a downwardly flowing trickle within the brine passages 78. The downward angle α of the tubes in FIG. 7, is empirically determined, based on the characteristics of the oil emulsion, having regard to the following considerations: Crude oil is produced from the reservoir in combination with particulate solids such as sand and clay, carried in suspension. When flow velocities and viscosities decrease, these solids will commence to settle out by gravity and will tend to clog the tubes unless the downward angle is such that the forward velocity of the oil will maintain the solids in forward motion, thereby clearing the tubes. A further consideration is the requirement that brine droplets collected on the interior surface 73 of the tubes will trickle by gravity downwardly to the open lower end of the tube, and thence to the sump of the tank for brine removal. It has been found that an angle of 30° to 45° is desirable for most conditions of viscosity, flow velocity, solids content and brine content. Steeper inclinations present excessive resistance to longitudinal flow of oil and therefore the minimum angle adequate to maintain the tubes in brine and solids-free condition, is desireable.

A horizontal plate 80, FIGS. 6 and 7, is secured to the upper surface 71 of the coalescing element 70, FIG. 8, in order to block off the top outlets of the uppermost row of passages 78, thereby preventing emulsion E from by-passing the downwardly inclined brine-collecting passages P in the tubes.

A transverse weir 104 of relatively small height is positioned in the lower interior portion of the treater section H intermediate the box 60 most adjacent the tank end 14 and the inner extremity of the outlet pipe 46, in order to maintain a constant brine level within the treater section H. Brine B will accumulate upstream of the weir 104 as viewed in FIG. 4 until it overflows the weir, whereupon it will collect for discharge through the brine outlet pipe 46.

The first and second heaters J and J' will supply heat to the compartments D and F at the heater end of the apparatus. The emulsion E as it is treated is in motion and sequentially flows through the two heater compartments E and F and thence into the treatment section H, all in horizontal flow, at relatively slow flow rates of the order of one-quarter foot to one foot per minute. In a two-stage heater configuration, the heat supplied by first heater J to the emulsion flowing into the first heater compartment E through inlet 32 adjacent the bulkhead 18 is only that necessary to lower the viscosity of the emulsion to the extent free gas and free brine separate therefrom. As free gas escapes from emulsion E the density thereof increases and the emulsion then flows downwardly and longitudinally within the compartment E towards the tank end 12. The temperature of the emulsion E will be further increased due to the heating effect of the lower tube 20 of the heater J, to further separate free gas and brine from the emulsion, the temperature being regulated by a control means 102a.

The free gas thus released in the first compartment D flows through the upper opening 36 into the upper portion of the second compartment F. Free water that separates from emulsion E in the first compartment D flows transversely through the lower opening 38 in the longitudinal bulkhead 16 into the second compartment F together with the partially heated emulsion E.

The emulsion E flowing into the second compartment F is further heated by the second heater J' only to the extent that the viscosity of the emulsion is lowered to a further point at which all of the dissolved gas will separate therefrom and rise to the upper portion of the second compartment F. The temperature in the second compartment lowers the viscosity of the emulsion E to the extent that not only does all of the dissolved gas separate, but a portion of the emulsified brine as well, the temperature being regulated by a control means 102b. This portion of the emulsified brine coalesces into drops that flow by gravity downwardly to the bottom portion of the second compartment F, and merge with brine that is flowed to the lower portion of the second compartment from the first compartment E.

The emulsion E that is substantially free of gas but still contains a substantial quantity of emulsified brine, flows through the intermediate opening 44 in the transverse bulkhead 18 into the treating section H. Gas G flows from the second heater compartment F into the upper portion of the treater section H through the upper opening 42 in the transverse bulkhead 18. Brine B that is collected in the lower portion of the heater compartment F flows through lower opening 40 in the transverse bulkhead 18 into the lower portion of the treater section H. It will be appreciated from FIG. 4 that the flow of gas G, brine B and emulsion E through compartments D, F and H is substantially horizontal, thereby offering less resistance to the rise of gas bubbles and the falling of brine droplets.

The emulsion E as it flows longitudinally through the treatment section H will advance with desirably low velocity, of the order of approximately one foot per minute, firstly to encounter the diffusion plates 54, located transversely in the upper portion of the treatment section H as shown on FIG. 1, passing through the transverse apertures formed therein, 56, thereby diffusing the flow uniformly across the width and depth of the tank 10. A minor pressure drop will occur across the diffusion plates 54, thereby further assisting in the release of remaining entrained gases from the emulsion E.

The emulsified brine will move downstream to the region of the electrostatic grids, K-1 to K-4, where the brine droplets are subject to a series of high potential fields surrounding the electrodes, and will take on an electrostatic charge therefrom. When so charged, these droplets rapidly move about repelling, attracting and colliding with one another, in energetic action since all droplets receive a charge, regardless of size. Droplets will collide with sufficient energy to overcome the emulsifying forces, and will so combine into larger drops, growing in mass. Further downstream movement of the emulsion progresses to the coalescing elements 70, where it will contact the metal tubes 72 where adhesion will occur, brine droplets then losing their charge and trickling downwardly on the interior surface thereof towards the lower ends 73 of the tubes 72, and then falling by gravity into the brine reservoir at the bottom of the tank 10, there merging with the brine that has flowed thereto from the second heater compartment F. As is well known, the deposition of minute brine droplets upon solid surfaces causes other droplets to coalesce therewith, thus producing minor streams which trickle downwardly by gravity to the bottom of the containing vessel. As emulsified brine is removed from the emulsion E, the de-emulsified oil that results therefrom is of lesser density than the emulsion and rises to the top of the emulsion for accumulation as an upper strata of oil, FIG. 4. The upper strata of oil will be understood to be free of gas and brine, and as the emulsion E continues to be supplied to the heater section D the liquid level rises in the treater section H, causing the oil O, free of gas and brine, to flow over the weir 37 into the reservoir R from which it may be either intermittently or continuously withdrawn without disturbing the liquid level of the emulsion E being treated in the treater section H.

It will be apparent that the weir 37 serves a three-fold purpose: First, automatically maintaining the liquid level within the compartments D, F and H at a desired depth; second, preventing commingling of brine and gas-free oil within the reservoir R with the emulsion being treated in the treatment section H; and third, allowing gas and brine-free oil to be withdrawn from the reservoir without affecting the liquid level of emulsion E in the compartments.

It will be apparent that the transverse solid baffles 55 will direct the flow of partially de-emulsified oil through the successive sets of electrostatic grids and coalescing elements for repetitive de-emulsification. By virtue of the coalescing elements 70, being positioned as depicted in FIG. 4, in successively increasing elevation in downstream progression within the treatment section H, the increasing depth of brine is accommodated without interference with the coalescing action.

The gas outlet 48 extends by its vertical standpipe 48a into the gas zone in the upper portion of the tank 10 as depicted in FIG. 1.

The brine outlet pipe 46 extends into the lower interior of tank 10 as shown in FIG. 4, and is ported for ingress of the brine for continuous discharge to exterior brine removal facilities (not shown).

A number of inverted, longitudinally-spaced boxes 60 extend longitudinally along the interior bottom portion 10a of tank 10 as shown in FIGS. 1 and 4. The boxes 60 have openings 62 in the sides thereof through which sand and silt (not shown) may flow to the interior thereof. The interior of each box 60 is connected to a first conduit 64 that extends outwardly through tank 10 to valve 66 as shown in FIG. 1. Second conduits 68 are connected to valve 66 and extend to header 69 adapted to carry settled particulate solids as a slurry when valves 66, FIG. 2, are opened to pressures substantially lower than that within the tank to permit the accumulated sand with some brine to be flushed.

It will be obvious that the treater may contain any desired number of sets of de-emulsifying elements and such specific configurations will normally be determined by the characteristics of the emulsion to be treated.

Figure 9:
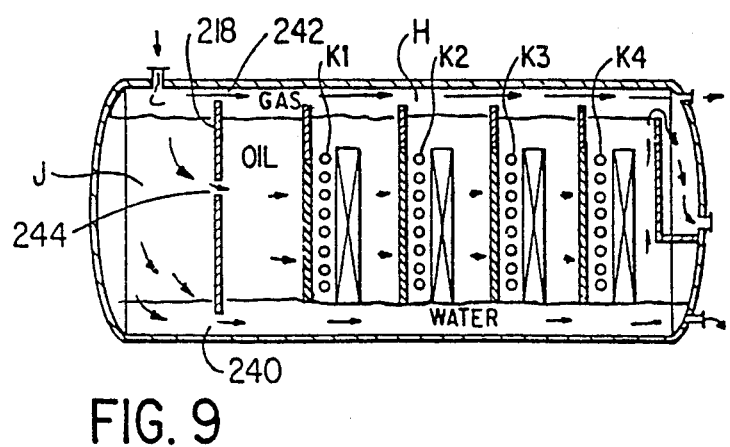
FIG. 9 is a longitudinal cross-sectional view of an alternative embodiment of the apparatus of the invention, in which the heater section is omitted from the construction.

It will be understood by those familiar with the art that under certain conditions of viscosity and gas entrainment it is unnecessary to employ heating at the upstream end of the treater, and under such circumstances the design depicted in FIG. 9 would be followed in which the exterior tank is fore-shortened and the heater section D of FIG. 1 is replaced by the reservoir J of FIG. 9. A bulkhead 218 separating the reservoir J, from the treatment section H, is symetrical, having an upper gas opening 242, and intermediate emulsion opening 244 and a lower brine opening 240, serving the same purposes as the gas opening 42, the emulsion opening 44 and the brine opening 40 of the heater design depicted in FIG. 1.

In operation, it will be recognized that the apparatus described will maintain a gas-emulsion interface of the treater section and a water-emulsion interface at a predetermined level in the lower portion of the treater section, thereby inducing uniform operation of the treater for uniform feed conditions.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

Although the foregoing invention has been described in some detail by way of illustration and example for purposes of clarity of understanding it will be obvious that certain changes and modifications may be practised within the scope of the appended claims.

What is claimed is:

1. In an emulsion separating treater for separating emulsified brine droplets from oil which includes a generally horizontally elongate metal tank constructed and arranged for longitudinal flow of the emulsion therethrough, the combination of:
   liquid diffusion and distribution means disposed within the said tank transversely to the flow of emulsion, said means adapted to distribute and diffuse the flow of emulsified brine and oil;
   electrostatic field means disposed within said tank downstream of said diffusion and distribution means adapted to charge said emulsified brine droplets with an electrical charge;
   coalescing means disposed within said tank in downstream relationship to said electrostatic field means,
   said coalescing means being electrically grounded and comprising a plurality of elongated open-ended metal tubes arranged in bundle configuration for throughflow of liquid whereby brine coalesces on the interior walls of said tubes, flows along said walls and falls by gravity into the lower portion of said treater.

2. An apparatus as defined in claim 1 in which said tubes are inclined to the direction of flow of liquid.

3. An apparatus as defined in claim 1 in which said tubes are inclined downwardly in the direction of flow of liquid.

4. In an apparatus for separating a mixture of oil, gas and brine emulsion into its components, including a generally horizontal elongate tank constructed and arranged for longitudinal flow therethrough and having an upstream fluid inlet and downstream gas, oil and water outlets; bulkheads defining a heater section and a treatment section in downstream relationship to said heater section; heater means in said heater section; liquid diffusion and distribution means in said treatment section disposed transversely to the flow of emulsion adapted to distribute the flow of emulsified brine and oil; electrostatic field means disposed in said treatment section in downstream relationship to said liquid diffusion and distribution means adapted to induce an electrical charge on droplets of brine in said brine emulsion; brine coalescing means comprising a bundle of elongated open-ended metal tubes, electrically grounded and disposed in said treatment section for receiving the flow of emulsion in downstream relationship to said electrostatic field means; and, means for maintaining liquid levels of selected depths within said tank whereby brine coalesces on the interior walls of said tubes, flows along said walls and falls by gravity into the lower portion of said treater.

5. The apparatus as defined in claim 4 in which said open-ended metal tubes are arranged in downwardly inclined relationship to the direction of flow.

6. The apparatus as defined in claim 4 in which said brine coalescing means comprises a tube bundle wherein the interior surface of each of said tubes defines a smooth passage over a first longitudinally extending portion thereof and a transversely corrugated passage over a second longitudinally extending portion thereof, said corrugations defining downwardly inclined brine passages operatively connected with brine passages in others of said tubes for collection and gravity delivery of brine to said water outlet.

7. The apparatus as defined in claim 4 in which said open-ended metal tubes are arranged in parallel.

8. A method of continuously treating a mixture of emulsified brine and oil in a treatment vessel in order to separate said emulsion into its components including the steps of:
 (i) directing said emulsion through distribution means in order to control the flow thereof through said vessel;
 (ii) then directing said emulsion through an electrostatic field in order to induce an electrical charge on the brine droplets in said emulsion;
 (iii) then directing said emulsion to electrically grounded brine coalescing means comprising a plurality of elongated open-ended metal flow tubes positioned in downstream relationship to said distribution means within said vessel and passing said emulsion through said plurality of elongated flow tubes within said vessel;
 (iv) collecting and coalescing said brine into drops on said brine coalescing means and thereafter collecting said brine by gravity settling therefrom for removal from said treatment vessel; and,
 (v) collecting and removing the de-emulsified oil from said treatment vessel.

9. The method of claim 8 in which said plurality of elongated flow tubes of the brine coalescing means comprises a tube bundle wherein the interior surface of each of said tubes defines a smooth passage over a first longitudinally extending portion thereof and a transversely corrugated passage over a second longitudinally extending portion thereof, said corrugations defining downwardly inclined brine passages operatively connected with brine passages in others of said tubes for collection and removal of brine.

10. A method of continuously treating a mixture of emulsified brine and oil and entrained gas in a treatment vessel in order to separate said mixture into its components including the steps of:
 (i) treating said mixture for separation and removal of the entrained gas;
 (ii) directing said de-gassed mixture through diffusion and distribution means in order to control the flow thereof;
 (iii) directing said diffused mixture through an electrostatic field in order to induce an electrical charge on the brine droplets in said mixture;
 (iv) directing said mixture containing the electrically charged brine droplets to electrically grounded brine coalescing means comprising a plurality of elongated open-ended metal flow tubes positioned in downstream relationship to said diffusion and distribution means within said vessel and passing said mixture through said plurality of flow tubes within said vessel;
 (v) coalescing said brine into drops on said brine coalescing means and thereafter collecting said brine drops by gravity settling for removal from said treatment vessel; and,
 (vi) collecting and removing the de-emulsified oil from said treatment vessel.

11. A method of continuously treating a flow of an emulsion of oil, gas and brine in order to separate said emulsion into its components including the steps of:
 (i) directing said continuous flow of emulsion sequentially through at least two heating zones and a treatment zone;
 (ii) heating said emulsion when in said first heating zone only to the extent that the viscosity thereof is lowered sufficiently to permit entrained gas and brine to separate therefrom;
 (iii) further heating said emulsion when in each of said additional heating zones in order to further lower the viscosity thereof to permit additional gas and brine to separate therefrom;
 (iv) directing said de-gassed emulsion from the last heating zone to the treatment zone by passing said emulsion through diffusion and distribution means in said treatment zone in order to control the flow thereof;
 (v) directing said diffused emulsion through an electrostatic field in said treatment zone in order to induce an electrical charge on the brine droplets comprising said brine emulsion;
 (vi) directing said emulsion, with said electrically charged brine droplets, in said treatment zone to brine coalescing means comprising a plurality of electrically grounded elongated open-ended metal flow tubes positioned in downstream relationship to said diffusion and distribution means and passing said emulsion through said electrically grounded elongated flow tubes, thereby to collect and coalesce emulsified brine remaining in the emulsion on said coalescing means, causing the emulsified brine to coalesce into drops that flow by gravity to the bottom of said treatment zone, with the de-emulsified oil rising to the top of the emulsion in said treatment zone to float as a strata thereon;
 (vii) continuously accumulating and removing the gas accumulated in said heating zones;
 (viii) continuously accumulating and removing the brine upon separation from the emulsion in said heating zones and said treatment zone; and,;
 (ix) continuously accumulating and removing the oil upon separation from the emulsion in said treatment zone.

12. In an emulsion separating treater for separating emulsified brine droplets from oil which includes a generally horizontally elongate metal tank constructed and arranged for longitudinal flow of the emulsion therethrough, the combination of:
 liquid diffusion and distribution means disposed within the said tank transversely to the flow of emulsion, said means adapted to distribute and diffuse the flow of emulsified brine and oil;
 coalescing means disposed within said tank in downstream relationship to said diffusion and distribution means, said coalescing means comprising a plurality of elongated open-ended metal tubes arranged in bundle configuration for throughflow of liquid whereby brine coalesces on the interior walls of said tubes, flows along said walls and falls by gravity into the lower portion of said treater.

13. An apparatus as defined in claim 12 in which said tubes are inclined to the direction of flow of liquid.

14. An apparatus as defined in claim 12 in which said tubes are inclined downwardly in the direction of flow of liquid.

15. In an apparatus for separating a mixture of oil, gas and brine emulsion into its components, including a generally horizontal elongate tank constructed and arranged for longitudinal flow therethrough and having an upstream fluid inlet and downstream gas, oil and water outlets; bulkheads defining a heater section and a treatment section in downstream relationship to said heater section; heater means in said heater section; liquid diffusion and distribution means disposed in said treatment section transversely to the flow of emulsion adapted to distribute the flow of emulsified brine and oil; brine coalescing means disposed in said treatment section transversely to the flow of emulsion and comprising a plurality of elongated open-ended metal flow tubes disposed in downstream relationship to said diffusion and distribution means; and, means for maintaining liquid levels of selected depths within said tank whereby brine coalesces on the interior walls of said tubes, flows along said walls and falls by gravity into the lower portion of said treater.

16. The apparatus as defined in claim 15 in which said tubes are arranged in downwardly inclined relationship to the direction of flow.

17. The apparatus as defined in claim 16 in which said open-ended metal tubes are arranged in parallel.

18. The apparatus as defined in claim 15 in which said brine coalescing means comprises a tube bundle wherein the interior surface of each of said tubes defines a smooth passage over a first longitudinally extending portion thereof and a transversely corrugated passage over a second longitudinally extending portion thereof, said corrugations defining downwardly inclined brine passages operatively connected with brine passages in others of said tubes for collection and gravity delivery of brine to said water outlet.

19. A method of continuously treating a mixture of emulsified brine and oil in a treatment vessel in order to separate said emulsion into its components including the steps of:
(i) directing said emulsion through distribution means in order to control the flow thereof through said vessel;
(ii) then directing said emulsion to brine coalescing means comprising a plurality of elongated open-ended metal flow tubes positioned in downstream relationship to said distribution means within said vessel and pasing said emulsion through said plurality of elongated flow tubes within said vessel;
(iii) collecting and coalescing said brine into drops on said brine coalescing means and thereafter collecting said brine drops by gravity settling thereof for removal from said treatment vessel; and,
(iv) collecting and removing the de-emulsified oil from said treatment vessel.

20. A method of continuously treating a mixture of emulsified brine and oil and entrained gas in a treatment vessel in order to separate said mixture into its components including the steps of:
(i) treating said mixture for separation and removal of the entrained gas;
(ii) directing said de-gassed mixture through diffusion and distribution means in order to control the flow thereof;
(iii) directing said mixture to brine coalescing means comprising a plurality of elongated open-ended metal flow tubes positioned in downstream relationship to said diffusion and distribution means within said vessel and passing said mixture through said plurality of flow tubes within said vessel;
(iv) collecting and coalescing said brine into drops on or said brine coalescing means and thereafter collecting said brine drops by gravity settling thereof for removal from said treatment vessel; and,
(v) collecting and removing the de-emulsified oil from said treatment vessel.

21. A method of continuously treating a flow of an emulsion of oil, gas and brine in order to separate said emulsion into its components including the steps of:
(i) directing said continuous flow of emulsion sequentially through at least two heating zones and a treatment zone;
(ii) heating said emulsion when in said first heating zone only to the extent that the viscosity thereof is lowered sufficiently to permit entrained gas and brine to separate therefrom;
(iii) further heating said emulsion when in each of said additional heating zones in order to further lower the viscosity thereof to permit additional gas and brine to separate therefrom;
(iv) directing said de-gassed emulsion from the last heating zone to the treatment zone by passing said emulsion through diffusion and distribution means in order to control the flow thereof;
(v) directing said emulsion in said treatment zone to brine coalescing means comprising a plurality of elongated open-ended metal flow tubes positioned in downstream relationship to said diffusion and distribution means and passing said emulsion through said elongated flow tubes, thereby to cause the emulsified brine to coalesce into drops that flow by gravity to the bottom of said treatment zone, with the de-emulsified oil rising to the top of the emulsion in said treatment zone to float as a strata thereon;
(vi) continuously accumulating and removing the gas accumulated in said heating zones;
(vii) continuously accumulating and removing the brine upon separation from the emulsion in said heating zones and said treatment zone; and,
(viii) continuously accumulating and removing the oil upon separation from the emulsion in said treatment zone.

* * * * *